United States Patent Office 2,735,482
Patented Feb. 21, 1956

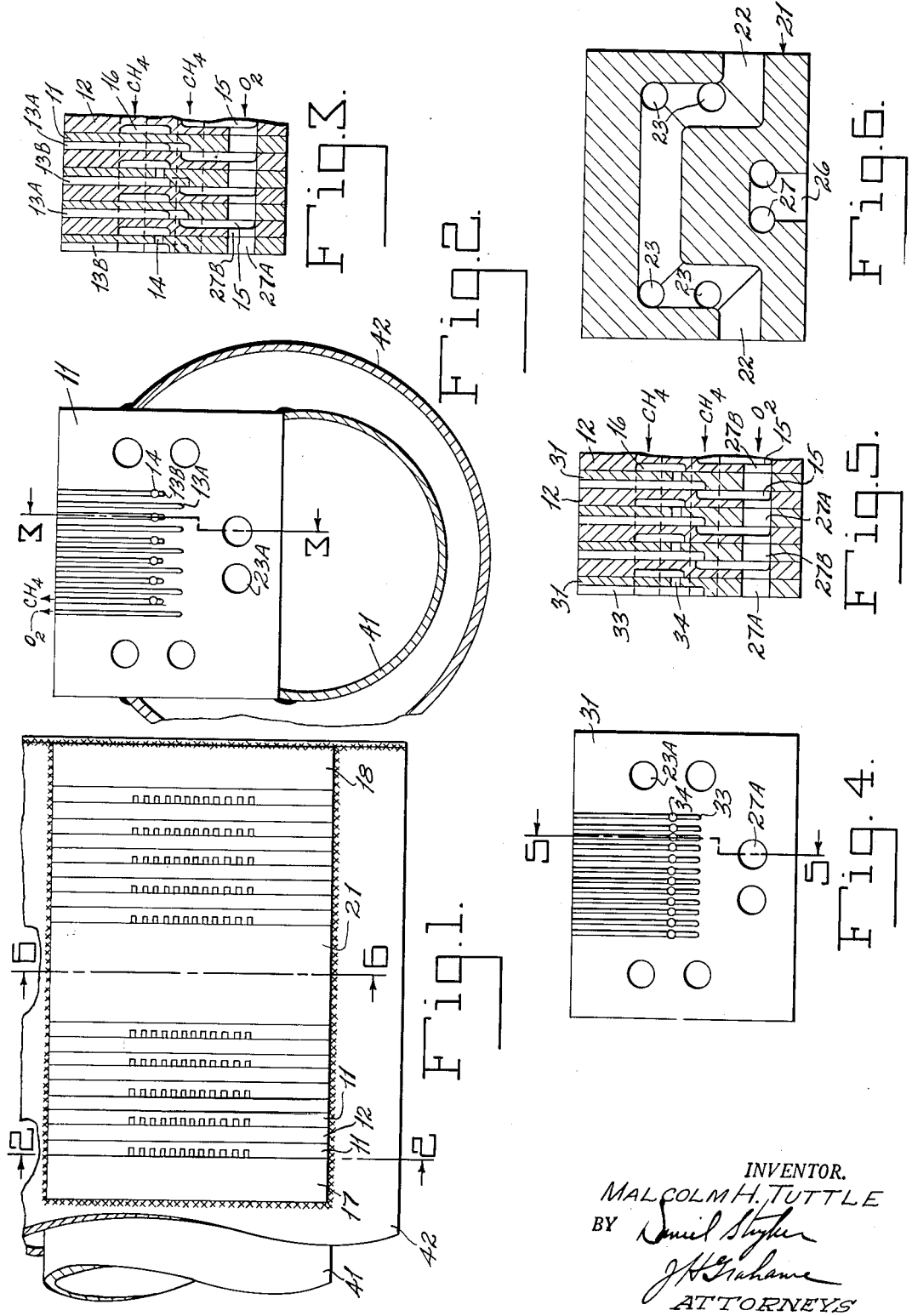

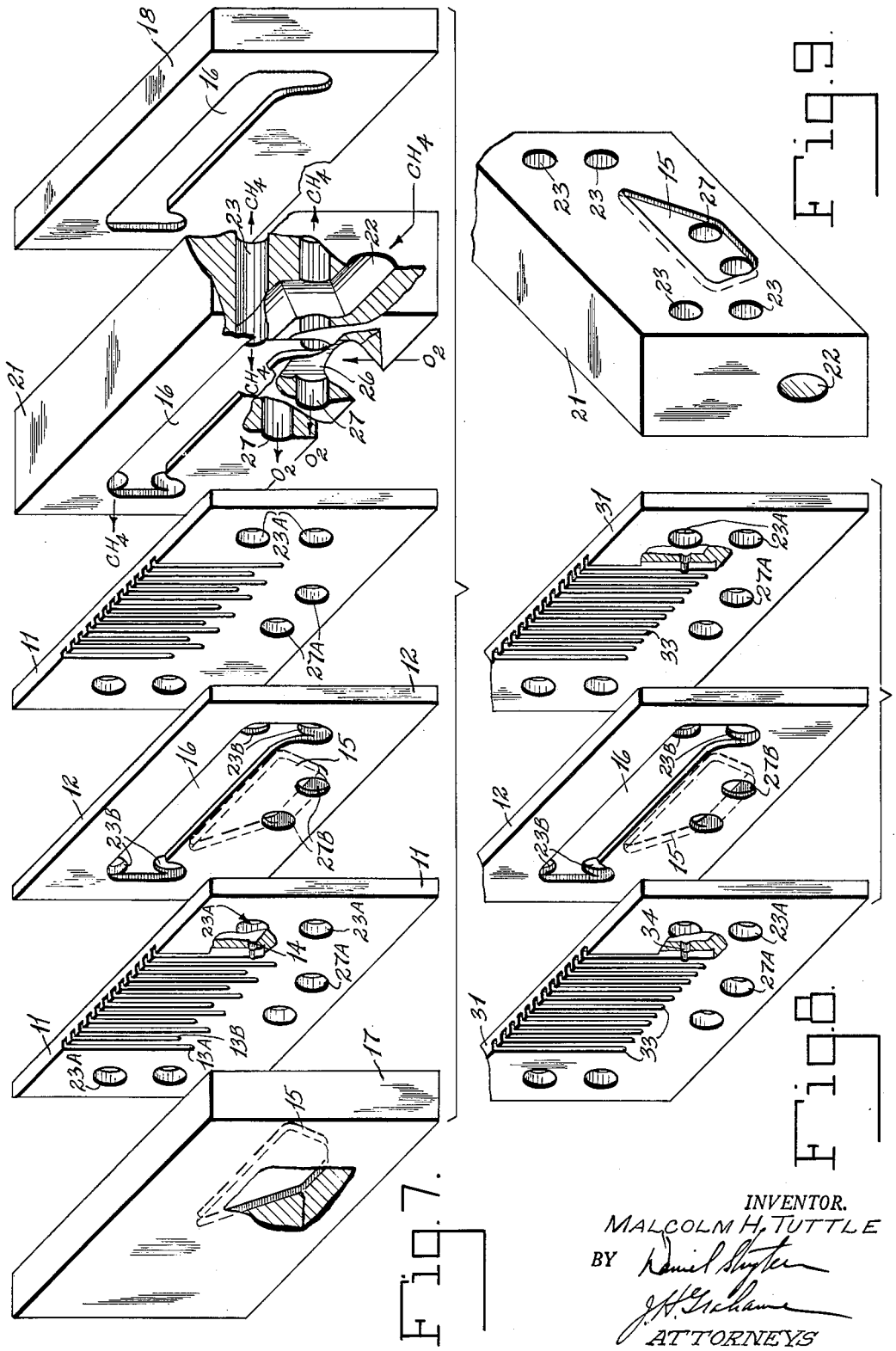

2,735,482

BURNERS FOR THE PRODUCTION OF SYNTHESIS GAS

Malcolm H. Tuttle, New Rochelle, N. Y., assignor to Hydrocarbon Research, Inc., New York, N. Y., a corporation of New Jersey Application December 7, 1951, Serial No. 260,485

5 Claims. (Cl. 158—118)

This invention relates to a method of and apparatus for mixing gaseous reactants. This invention is particularly useful for the production of carbon monoxide and hydrogen by the reaction of a gaseous hydrocarbon with oxygen-enriched air or substantially pure oxygen. In one of its more specific aspects, the present invention relates to a method of introducing reactant gases into a reaction zone for the production of synthesis gas.

The generation of synthesis gas, i. e., a mixture of carbon monoxide and hydrogen, by partial combustion of a hydrocarbon with an oxygen-containing gas, is known in the art. By this process, a hydrocarbon fuel is reacted with air, oxygen-enriched air or with relatively pure oxygen at a temperature within the range of from about 2,000° F. to about 3,000° F. The operation may be carried out at atmospheric or at an elevated pressure, for example, as high as 500 pounds per square inch gauge. Synthesis gas is used commercially for the manufacture of hydrocarbons, oxygenated hydrocarbons, and ammonia. It is also important as a source of hydrogen for other chemical processes.

For efficiency of conversion of fuel gas and an oxygen-containing gas to carbon monoxide and hydrogen with minimum production of undesirable by-products, such as carbon dioxide, water vapor and free carbon, it is desirable to effect rapid and intimate mixing of the reactants. Mixing of the reactants may take place within a suitable mixer or burner, or within the reaction zone after they are discharged from the burner. When pure oxygen is used as the oxygen-containing gas, considerable difficulty has been experienced with premixing the reactants. One of the chief disadvantages of premixing the reactants is the tendency of the flame to flash back into the supply conduit or burner through which the mixture is introduced into the reaction zone. With air or oxygen-enriched air containing on the order of, for example, 40 per cent oxygen by volume, premixing of the reactants may be successfully accomplished provided the stream of reactants is introduced into the reaction zone at a flow rate in excess of the rate of flame propagation. With relatively pure oxygen, the flash-back problem becomes so severe, particularly at high pressure, that it is almost mandatory to introduce the reactants separately to the reaction zone.

The separate introduction of oxygen and fuel gas into the reactor also poses some problems, the principal one of which is that of insuring complete and rapid mixing of the reactants at the point of introduction to the reaction zone. Any fuel gas which is not admixed with oxygen immediately upon introduction to the reaction zone undergoes cracking to form free carbon. Any oxygen which is unmixed at the point of introduction to the reaction zone attacks exposed surfaces, such as the burner elements and walls of the reaction zone, and tends to increase the yields of undesirable carbon dioxide. The present invention is designed to overcome the disadvantages of burners, i. e., the apparatus used for mixing reactants and introducing them to the reaction zone.

An object of this invention is to provide an improved method for the introduction of fuel gas and oxygen into a reaction zone. Another object is to provide an improved method for the generation of carbon monoxide and hydrogen by reaction of a fuel gas with oxygen. Still another object of this invention is to provide an improved burner, particularly useful for the generation of carbon monoxide and hydrogen from a fuel gas and oxygen.

In accordance with the present invention, fuel gas and an oxygen-containing gas are introduced into the reaction zone in a large number of small streams. In one embodiment of the invention, the oxygen-containing gas and fuel gas are admixed within the burner and the mixture discharged in a large number of parallel-flowing small streams. In another embodiment of the invention, the oxygen-containing gas and fuel gas are introduced separately as alternate adjacent streams in parallel flow. The invention will be more readily understood from the following detailed description of burners which are suitable for carrying out the process of this invention.

Figure 1 of the drawings is a plan view of a burner embodying the principles of the present invention.

Figure 2 is a vertical cross-section taken along plane 2—2 of Figure 1.

Figure 3 is a vertical cross-section taken along plane 3—3 of Figure 2.

Figure 4 is an elevational view of an alternative element or plate, to effect premixing of the reactants, which may be used in the burner of Figures 1 and 2.

Figure 5 is a vertical cross-sectional view of an assembly of elements of the type illustrated in Figure 4, taken along plane 5—5 of Figure 4.

Figure 6 is a vertical cross-section along plane 6—6 of Figure 1.

Figure 7 is an exploded perspective view illustrating the relationship of the various parts of the burner elements in Figures 1 to 3.

Figure 8 is an exploded perspective view showing the relationship in the burner assembly of the elements illustrated in Figures 4 and 5.

Figure 9 is a perspective view of the distributor element shown in cross-section in Figure 6.

With reference to Figures 1 to 3, 6, 7 and 9 of the drawings, a burner assembly of this invention is illustrated in which parallel alternate streams of reactant gases are discharged from the burner. Mixing of the gases takes place after discharge from the burner.

The burner assembly is made up of a plurality of alternately arranged flat feed plates 11 and distributor plates 12. The feed plates are rectangular in shape and have a plurality of parallel grooves on one side, extending from the top edge of the plate to its interior. The grooves comprise alternate long grooves 13A and shorter grooves 13B arranged to conduct alternate separate streams of reactants. Holes 14 are provided in the feed plate near the lower end, or inner end, of each of the shorter grooves 13B. Reactant gas may thus be supplied to each of the shorter grooves through holes 14 from the opposite side of the feed plate.

Distributor plates 12 fit snugly against feed plates 11, closing the open side of the channels to form parallel conduits open at the top edges of the plates. Reactants are thus discharged in parallel streams from the top of the burner. The reactant gases are supplied to the respective grooves in the feed plates by channels 15 and 16 in the distributor plates. Channel 15 cooperates with the lower ends of the grooves 13A beyond the lower ends of grooves 13B so that gases from channel 15 are distributed uniformly to these grooves. Similarly, a distributor channel 16 positioned in a distributor plate on the opposite side of the feed plate extends across the row of holes 14 in the feed plate to supply a gaseous reactant uniformly to each of the shorter grooves 13B. End plates 17 and 18 similarly are provided with distributor channels 15 and 16, respectively.

The feed gases enter through a central manifold distributor plate 21 intermediate groups of feed plates and distributor plates in the burner assembly. The central manifold distributor plate 21 supplies the reactant gases to the individual distributor plates and feed plates. A passageway 22 for admitting one of the feed gases, for example, a hydrocarbon gas to the burner, is provided in the central manifold distributor plate 21. Gas entering the burner assembly through passageway 22 is distributed into the various passageways 23 communicating with channels 16 in the distributor plates. In each of the feed plates and distributor plates corresponding openings 23A and 23B, respectively, are provided to form a continuation of passageway 23 through the burner assembly to supply gas to all of the distributor channels 15. Similarly, the other reactant gas, for example, oxygen, is admitted to the central distributor plate 21 through passageway 26 from which it is distributed to passageways 27 communicating with channels 15 in the distributor plates. Corresponding openings 27A are provided in the feed plates 11, and 27B, in the distributor plates 12 to form a continuation of passageway 27 through the burner and to supply oxygen to all of the various distributor channels 15.

In operation, one of the gases, for example, methane, enters the burner assembly through passageway 22 and flows through passageway 23 to the various distributor channels 16. From channels 16 the gases pass through openings 14 into grooves 13B along which they flow and are discharged from the top of the burner. The other gas, for example, oxygen, enters through passageway 26 and flows through passageway 27 to channels 15 in the distributor plates. The oxygen is introduced directly from the channels 15 to the lower portion of grooves 13A, through which it flows and is discharged from the top of the burner in a plurality of streams intermediate the streams of methane discharged from grooves 13B.

In an alternative burner illustrated in Figures 4, 5, and 8, of the drawings, the gases are premixed in the grooves of the feed plates and streams of premixed gases discharged from the top of the burner. The burner assembly is made up of the same elements as described above in connection with Figures 1 to 3, 6, 7, and 9 except that a feed plate 31 replaces feed plates 11. Feed plates 31 are provided with parallel grooves 33 all of which are of the same length. A hole 34 through plate 31 is provided for each of the grooves 33. These holes are a short distance above the lower ends of the grooves. Openings 23A and 27A are provided in plates 31 corresponding to the openings in plates 11 to provide a passageway for the gases to the distributor channels.

In the operation of the modification of the burner illustrated in Figures 4, 5, and 8, gas introduced through passageways 22 and 23 into distributor channels 16 flow through holes 34 into each of grooves 33 in the feed plates 31. Gas entering the burner through passageway 26 flows through passageways 27 into distributor channels 15. From channels 15, the gas is supplied to each of the grooves 33 in the feed plate 31 at a point below the point at which the other gas is introduced through holes 34. Thus the gases are mixed within the grooves 33 so that separate premixed streams are discharged from each of grooves 33 through the openings at the top of the burner.

Separate streams of reactant gases are supplied to passageways 22 and 26 in the central distributor plate of the burner. One method of supplying gases is illustrated in Figures 1 and 2. With reference to these figures, the burner assembly previously described is inserted into openings in the walls of concentric pipes 41 and 42, suitably held in place and sealed to prevent leakage. With metal plates, the burner assembly may be welded to the pipes. If ceramic burner plates are used, they may be assembled into a unitary burner structure by the use of refractory cement, fired at a proper temperature, and the burner assembly attached in sealing relationship with pipes 41 and 42 in conventional manner, generally by means of clamps and gaskets, not illustrated. One of the gases, an oxygen-containing gas, for example, is supplied through pipe 41, and the other, for example, a hydrocarbon fuel gas, is supplied through the annular space between pipes 41 and 42. In this arrangement, the feed pipes 41 and 42 support the burners, as well as supply reactant gases thereto. Pipes 41 and 42 may supply and support a number of such burner assemblies.

Obviously many modifications and variations of the invention, as hereinbefore set forth, may be made without departing from the spirit and scope thereof and, therefore, only such limitations should be imposed as are indicated in the appended claims.

I claim:

1. Apparatus for mixing gaseous reactants which comprises a flat plate; a plurality of spaced parallel grooves in one face of said plate, said grooves extending from the interior of said plate to one edge of the plate with alternate grooves extending beyond the inner ends of the remaining intermediate grooves; a second flat plate coextensive with the first plate and positioned against the grooved face of said first plate to close said grooves and form elongated parallel passageways open at one edge of said plates; a transverse passageway in said second plate coinciding with the longer grooves beyond the inner ends of said shorter grooves to supply a stream of reactant gas to each of said longer grooves; openings in said first plate adjacent the inner end of each of said shorter grooves; a conduit for one of said gaseous reactants communicating with each of said openings on the side of said first plate opposite said parallel grooves; and a second conduit for the other of said gaseous reactants communicating with said transverse passageway in said second plate.

2. Apparatus for mixing gaseous reactants which comprises a flat plate; a plurality of spaced parallel grooves in one face of said plate, said grooves extending from the interior of said plate to one edge of the plate with alternate grooves extending beyond the inner ends of the remaining intermediate grooves; a second flat plate coextensive with said first plate positioned against the grooved face of said first plate to close the open sides of said grooves and form conduits terminating at one edge of said plates, a transverse passageway in said second plate extending across the inner ends of said longer grooves to supply a reactant gas only to the conduits formed by said longer grooves; openings in said first plate adjacent the inner end of each of said shorter grooves; a third flat plate coextensive with said first plate and positioned against the opposite side of said first plate from said grooves; a transverse passageway in said third plate cooperating with said openings to supply a second reactant gas through an opening in said first plate to each of said shorter grooves; a conduit for a first gaseous reactant communicating with said transverse passageway in said second plate; and a conduit for a second gaseous reactant communicating with said transverse passageway in said third plate.

3. Apparatus as defined in claim 2 wherein said conduit for said first reactant comprises an opening in each of said plates in register with one another, and said conduit for said second reactant comprises a second opening in each of said plates in register with one another.

4. Apparatus for mixing gaseous reactants which comprises a flat plate; a plurality of spaced parallel grooves in one face of said plate, said grooves extending from the interior of said plate to one edge of the plate; a second flat plate coextensive with said first plate positioned against said first plate to close the open sides of said grooves and form conduits terminating at one edge of said plates; a transverse passageway in said second plate extending across the inner ends of said grooves to supply a reactant gas to each of said grooves; openings in said first plate adjacent the inner end of each of said grooves; a third flat plate coextensive with said first plate and positioned against the opposite side of said first plate from said grooves; a transverse passageway in said third plate cooperating with said openings to supply a second reactant gas through said openings in said first plate to each of said grooves; a conduit for a first gaseous reactant communicating with said transverse passageway in said second plate; and a conduit for a second gaseous reactant communicating with said transverse passageway in said third plate.

5. Apparatus as defined in claim 4 wherein said conduit for said first reactant comprises an opening in each of said plates in register with one another, and said conduit for said second reactant comprises a second opening in each of said plates in register with one another.

References Cited in the file of this patent

UNITED STATES PATENTS

| | | |
|---|---|---|
| 873,624 | Springer et al. | Dec. 10, 1907 |
| 1,484,107 | Zander | Feb. 19, 1924 |
| 1,568,771 | Roy | Jan. 5, 1926 |
| 2,484,123 | Scherl | Oct. 11, 1949 |
| 2,541,428 | Lev et al. | Feb. 13, 1951 |